United States Patent [19]
Dowden

[11] Patent Number: 5,017,077
[45] Date of Patent: May 21, 1991

[54] RAIL CAR DUMPERS

[75] Inventor: Paul J. Dowden, Bristol, England

[73] Assignee: Strachan & Henshaw Limited, Bristol, England

[21] Appl. No.: 389,171

[22] Filed: Aug. 3, 1989

[30] Foreign Application Priority Data

Aug. 10, 1988 [GB] United Kingdom ............... 8819012

[51] Int. Cl.⁵ ............................................. B65G 67/42
[52] U.S. Cl. .................................... 414/360; 414/372
[58] Field of Search ........................... 414/359–361, 414/371, 372

[56] References Cited

U.S. PATENT DOCUMENTS

| | | | |
|---|---|---|---|
| 1,821,217 | 9/1931 | Heaton et al. | 414/361 |
| 2,533,090 | 12/1950 | Bur | 414/359 X |
| 2,896,935 | 7/1959 | Osojnak et al. | 414/359 X |
| 3,116,843 | 1/1964 | Clark | 414/361 |
| 3,220,576 | 11/1965 | Cheek | 414/359 |
| 3,373,829 | 3/1968 | Suman et al. | 414/360 X |
| 4,024,962 | 5/1977 | Cheek et al. | 414/360 X |
| 4,043,467 | 8/1977 | Hand, Jr. | 414/372 X |

Primary Examiner—Robert J. Oberleitner
Assistant Examiner—Alfred Muratori
Attorney, Agent, or Firm—Brumbaugh, Graves, Donohue & Raymond

[57] ABSTRACT

A rotary rail car dumper has a rail car platform forming part of a rigid tipping structure which, through end ring members, is mounted for rotation about a central longitudinal axis for tipping a rail car to dump its contents. Between the rail car platform and the ring members are pin joint connections allowing flexure under gravity loading independently of the ring members, at least before tipping. The maximum stresses occurring during operation of the dumper are thereby reduced. The dumper installation is also provided with means for extending the length of the rail car platform in order to handle rail cars of different lengths in unit trains.

12 Claims, 4 Drawing Sheets

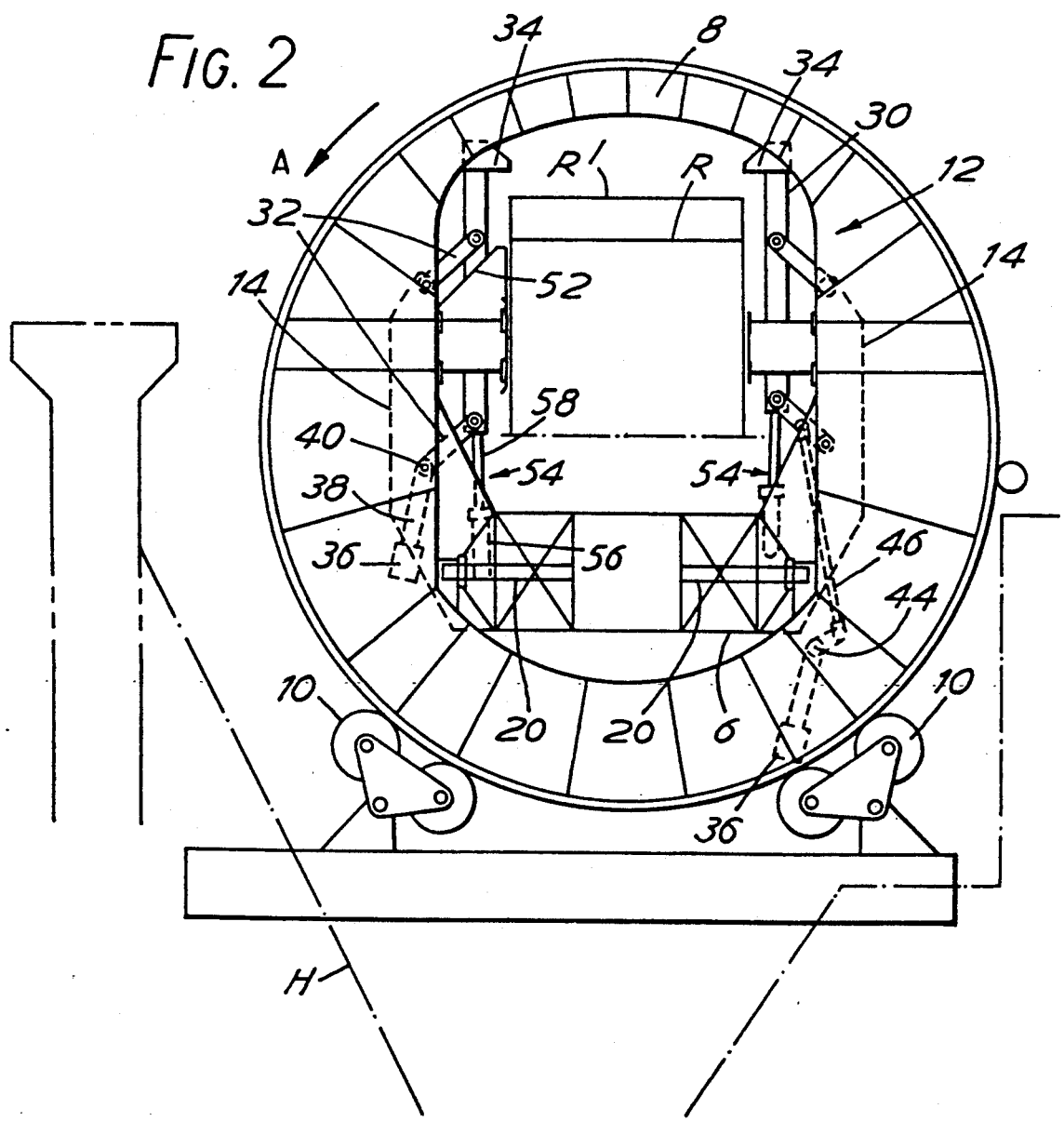

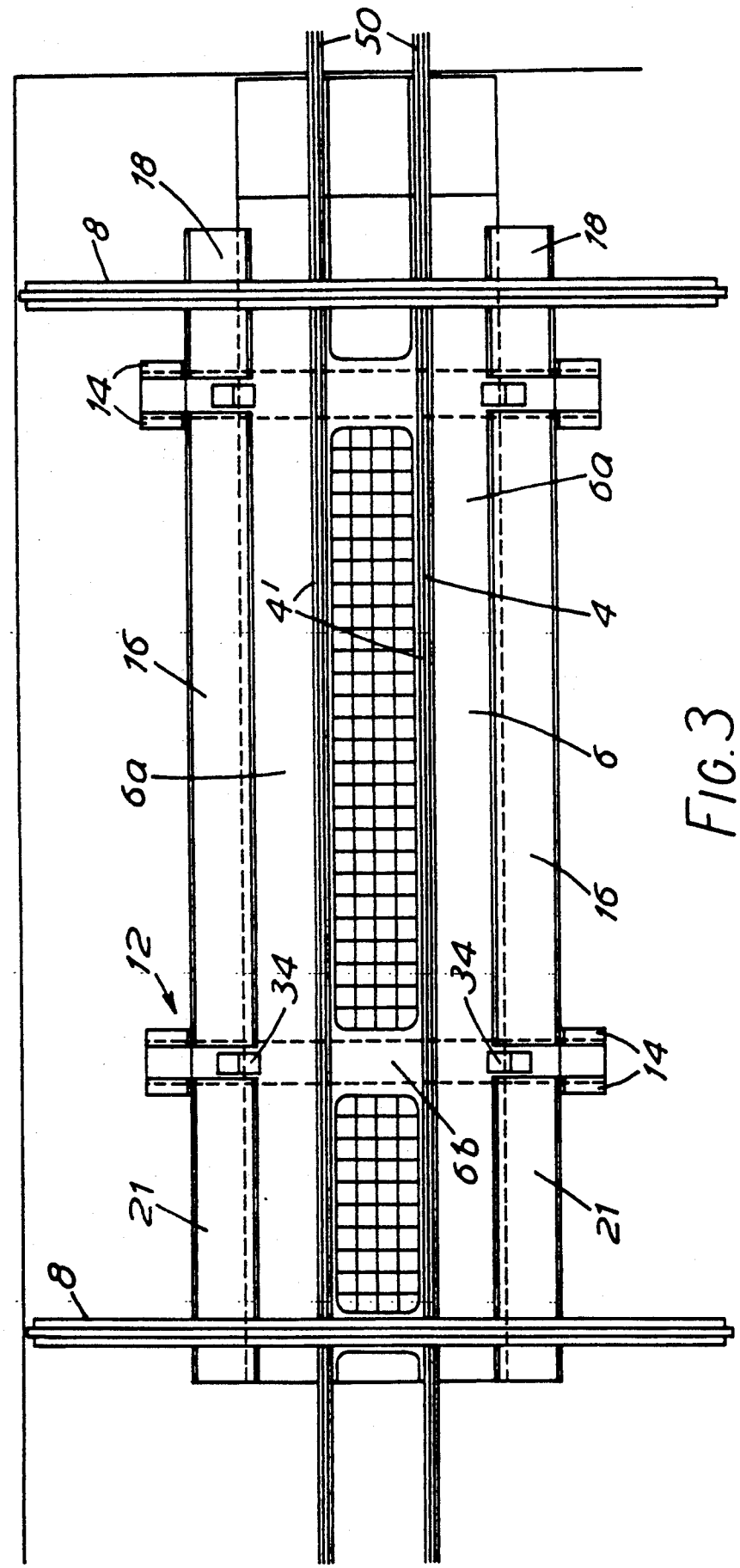

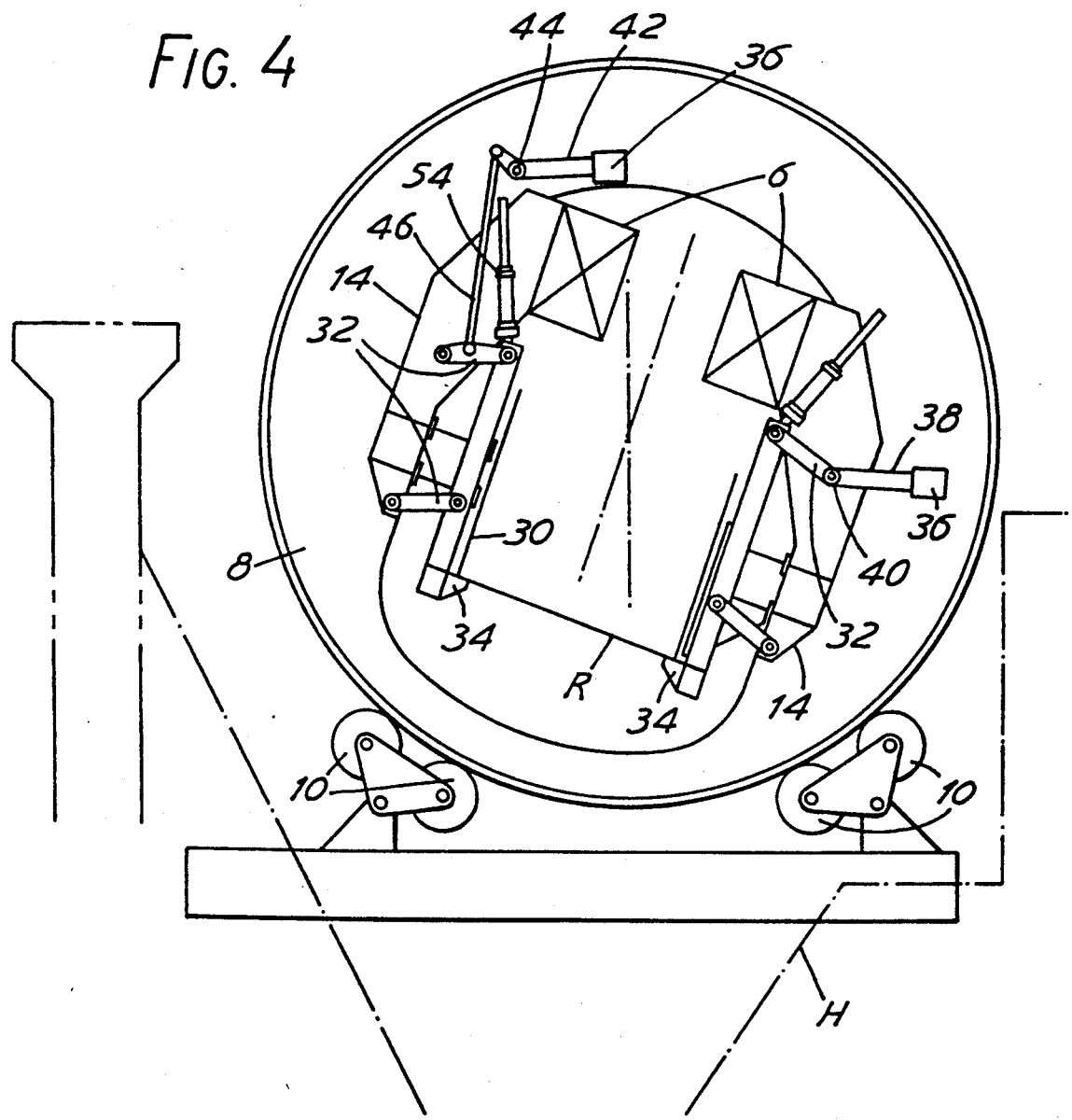

RAIL CAR DUMPERS

BACKGROUND OF THE INVENTION

This invention relates to rail car dumpers, and in particular to rotary dumpers, for discharging bulk materials from rail cars by tipping.

Rotary dumpers typically comprise a rigid cylindrical cage within which a section of rail track extends, parallel to the cylindrical axis, for receiving a rail car which is held while the cage is rotated about its own axis, this often being substantially the center of gravity of the car, to tip or dump the contents of the car into a hopper immediately below the dumper. It is found with this type of construction that the rotary tipping structure is prone to failure in prolonged use. Strengthening of the structure to avoid that problem increases its weight and can cause a significant increase in the costs of construction and operation of the dumper.

SUMMARY OF THE INVENTION

According to one aspect of the present invention, there is provided a rotary dumper having a tipping structure comprising a platform for a rail car and clamping means being mounted on said structure for clamping a car on said platform, coaxial ring members at or adjacent the ends of the tipping structure, said ring members being supported on mountings for rotation of said structure about the axis of the ring members to dump the contents of a car clamped on the platform, flexible connections being provided between the rail car platform and the ring members for limiting the transmission of bending moments therebetween.

The flexible connections may comprise pin joints with their rotary axes transverse to the rotary axis of the tipping structure and at least approximately parallel to the rail car platform. With this arrangement, flexure of the structure under the weight of a loaded rail car does not transmit bending moments to the end ring members of the dumper while the platform and rail car are upright. That is no longer true when the car is tipped, but the load is relieved as its contents are discharged so that the stresses transmitted through the tipping structure are correspondingly reduced. Consequently, the end ring members are subjected to substantially lower bending loads and, at the same time, it may be possible to tolerate a greater degree of bending deflection in the load-carrying structure flexibly connected to the ring members so that this structure also can be of a lighter construction.

Preferably the tipping structure comprises a main load carrying member or members extending uninterruptedly between the end ring members and preferably below the level of a rail track on the rail car platform.

Because of the location of the tipping axis close to the center of gravity of a rail car, rotary dumpers may be used for handling unit trains, i.e. trains in which the rail cars are provided with swivel couplings aligned with the rotary axis of the dumper that allow the cars to remain coupled together while each in turn is tipped to discharge its load. Dumper installations designed for this purpose can only handle rail cars of a specified length; it will be understood that the rotary structure must be at least equal to the length of the rail car being tipped, but must not be so long that an adjacent rail car overhangs it.

According to another aspect of the invention, a dumper installation is provided that can operate with different lengths of rail car, the installation having a rail track comprising a first section mounted on a displaceable platform, the platform being part of a tipping structure having means for clamping a rail car on said first section of track on the platform while the structure is rotated to dump the contents of the rail car, adjacent at least one end of the platform there being a fixed second section of track with which said first section can be aligned, said first and second sections of track having a spacing between them that is spanned by a linking section of track, said linking section forming an extension of said first rotary section and being secured to said first section, or forming an extension of said second fixed section and being secured to said second section, whereby to vary the operative length of the rotary rail car platform.

Such an arrangement is not limited to use with rotary dumpers and can be applied to other tipping rail car dumpers intended for use with unit trains, such as crescent dumpers.

Preferably, said linking section of track is provided alternatively by a length of track carried by the tipping structure or by a length of track supported from a fixed structure and independently of the tipping structure, said lengths of track being locatable alternatively in an operative position in which said first and second track sections are linked in a continuous track length.

By way of example, the invention will now be described in more detail with reference to the accompanying drawings.

BRIEF DESCRIPTION OF THE DRAWINGS

FIGS. 2 and 3 are, respectively, an end view and a plan view of the dumper in FIG. 1, and FIG. 4 is a further end view showing the rotary structure of the dumper in its fully rotated discharge position.

DESCRIPTION OF THE PREFERRED EMBODIMENT

Figure 1:
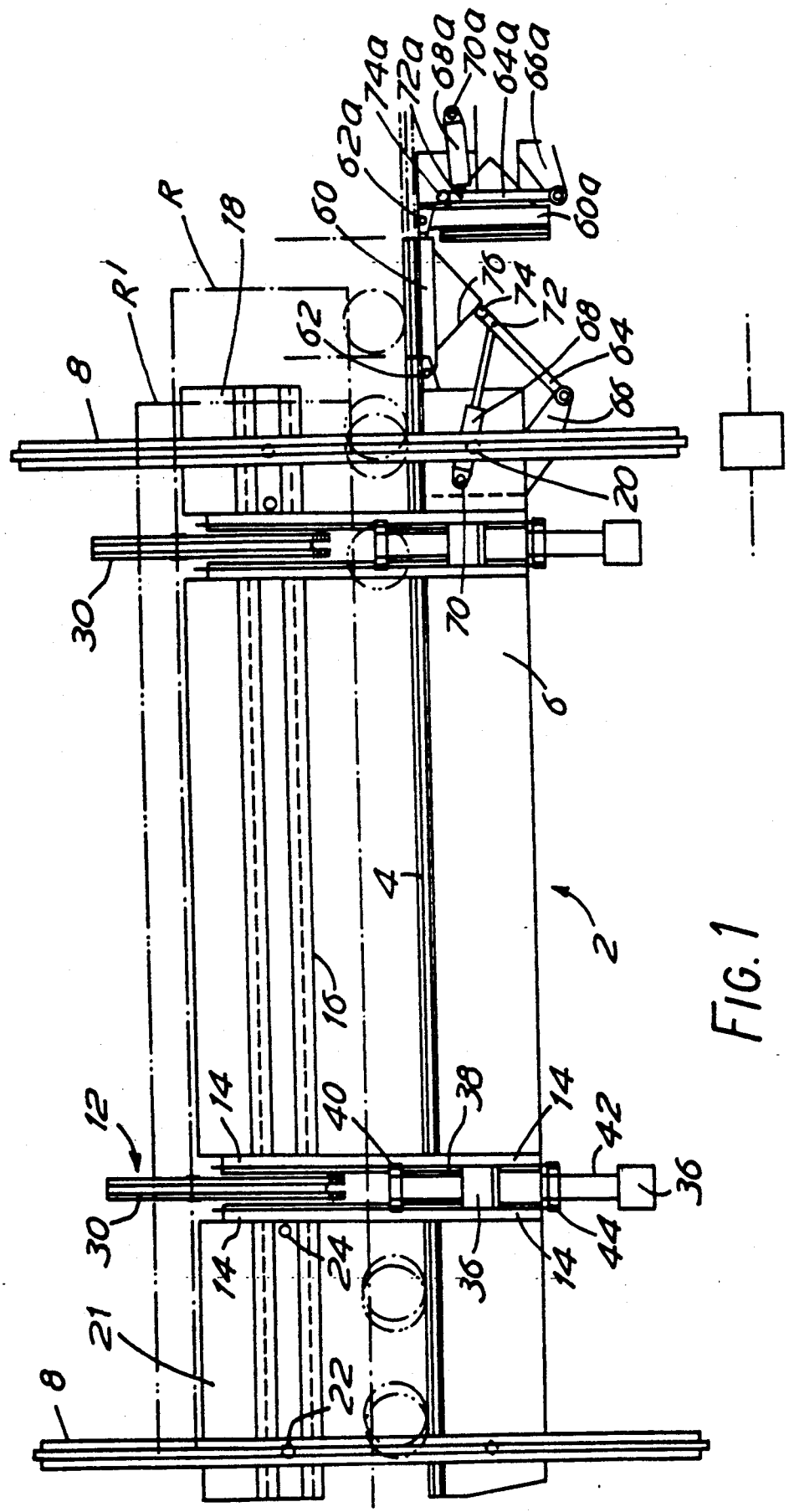
FIG. 1 is a side view of a rotary dumper with the rail car platform in the upright position.

The illustrated dumper comprises a tipping structure 2 with a rail car platform 4 formed a rail track 4' secured on a bottom beam 6, comprising two elongate box sections 6a with integral webs 6b, which extends between respective end rings 8 of the structure that are mounted on rollers 10 for rotation of the structure about a common center of the rings. Drive means (not shown) to rotate the structure may be of conventional form, e.g. comprising an electric motor acting on gear rings fixed on one or both end rings. At positions between but adjacent the end rings, the bottom beam carries top clamping means 12 for a rail car on the platform. On each side of the track 4' at each of these positions there is a pair of spaced parallel horns 14 projecting upwards. In the gap between the horns of each pair a clamping mechanism is mounted, the mechanism being described in more detail below, so that a rail car can be clamped on opposite sides of the platform.

The tipping structure also includes side beams at opposite sides of the rail car platform Each beam consists of a main length 16 extending between and secured to the horns 14 of the clamping means on that side of the platform, and end portions 18,21 that project from the horns through the end rings 8 to terminate in or near the same vertical plane as the corresponding end of the rail car platform 4. The bottom beam 6, horns 14 and side beams 16 are an essentially rigid, e.g. welded, assembly. The end rings 8 are pin-jointed to the welded assembly by connecting pins 20 and the side beam extensions are pin-jointed to their end rings and the welded structure, by connecting pins 22,24 respectively. The pins 20,22,24 have their axes horizontal in the upright position of the dumper shown in FIG. 2 and extending transversely to the rail car platform. Bending moments on the bottom beam, e.g. due to the weight of a loaded rail car on the platform, are thus not transmitted to the end rings. Other forms of flexible connection can be employed, such as ball joints, to reduce the transmission of bending moments to the end rings.

The clamping mechanism mounted in each pair of horns 14 comprises a clamping bar 30 disposed between the horns of the pair and connected to the horns through a parallel motion linkage comprising a pair of links 32, so that a hook 34 at the top of the bar 30 can be moved into and out of engagement with the top of a rail car R on the platform. With the tipping structure upright, each hook is held in a raised, inoperative position by a counter-weight 36 that is connected to the links 32 to pivot therewith. The mechanism appearing on the left-hand side of the platform in FIG. 2 has the counter-weight 36 on the end of an arm 38 secured to a torque bar 40 that is fixed to and forms the pivot connection of the lower link to its horn. In the mechanism on the right-hand side, the counter-weight 36 is on one end of a cranked lever 42 the pivot 44 of which is fixed relative to the horns 14, the other end of the lever being connected by a further link 46 to the lower of the parallel motion links 32; the difference between the mechanisms is due to the different clearance needs for the movement of the counter-weights on each side of the platform 4 to operate the clamping hooks 34 when the structure is rotated anti-clockwise, as indicated by the arrow A, to dump the contents of the rail car into a hopper H directly below the dumper.

FIG. 2 also illustrates a fairing 52 provided over the side beam 16,18,21 on the left-hand side of the platform for guidance of the material being dumped into the hopper H as the rotary structure begins to be tipped.

In operation, a rail car is driven onto the rail track 4' on the platform 4 from the fixed track 50 while the platform is in its upright position shown in FIGS. 1 and 2. The tipping structure is then rotated in the direction A and, as the platform begins to tilt, the side of the rail car comes to bear against the side beam 16,18,21 on the left-hand side of FIG. 2. In the initial movement, the counter-weights 36 still hold the clamping hooks 34 raised because they lie to the left of their suspending pivots 40,44 as seen in FIG. 2. As the tipping angle reaches some 10°, the center of gravity of each counter-weight passes through a vertical plane from the respective pivot. With continuing rotation beyond that angle the gravity forces on the counter-weights swing them on their pivots to rotate the links 32 and so bring the clamping hooks 34 onto the top edge of the rail car sides to hold it on the platform rails. Tipping continues to dump the rail car contents, the normal maximum angle of tip being 160°, although rotation to 180° is possible.

To secure the hooks against the rail car during tipping, locking devices, which may be of conventional form, such as single-acting hydraulic cylinders, are connected to each clamping mechanism to be actuated by trip means once the hooks have engaged the rail car. Alternative locking devices are illustrated, however, in the form of "BEAR-LOC" friction units 54 (from Sacol Powerline Limited of Totton, Southampton, UK) connected to each clamping mechanism. These proprietary units comprise concentric inner and outer sleeves 56 through which a rod 58 extends. The sleeves are axially fixed relative to each other and the rod is normally locked frictionally by an interference fit with the inner sleeve. Hydraulic fluid can be supplied under pressure to the interface between the rod and the inner sleeve, so relaxing the interference fit and allowing the rod to slide in the sleeve. In its inoperative position, therefore, while the clamping hooks 34 are raised, hydraulic pressure is applied to the locking devices to allow the rods to move freely. When the gravity-operated mechanisms act to lower the hooks into engagement with a rail car, the hooks are locked in their operative position by trips (not shown) between the clamping mechanisms and the tipping structure releasing the hydraulic pressure.

The trips act conversely to reapply hydraulic pressure to the locking devices as the emptied rail car is returned to the upright position In the final stage of the return motion the gravity operated clamping mechanism raises the hooks.

The dumper is designed for discharging unit trains, in which rail cars remain coupled together with a limited fixed spacing between adjacent cars. Known installations of this kind have to be designed for a specific length of rail car. The illustrated installation, however, is arranged to be capable of dealing with two different standard lengths of rail car, i.e. a shorter length car R' in addition to the car R shown on the tipping structure in FIG. 1. For this purpose, there is an intermediate linking section of track between the rail track on the rail car platform and the fixed track leading to the platform, this section being formed alternatively by an extension 60 on the platform or by an extension 60a of the adjacent fixed track section, both sections carrying rails that can be aligned with the main track section of the platform and with the adjacent fixed track. The platform extension 60 is shown in operative position in FIG. 1 to deal with the longer length rail car R.

The platform extension 60 is connected to the platform through a hinge 62 and is supported in its operative position by struts 64 pivoted on lugs 66 projecting from the bottom beam 6. A hydraulic ram 68 has pivot connections 70,72 to the bottom beam and the struts respectively. Each strut 64 carries a roller 74 that bears on a cam track 76 depending from the platform extension and in the state shown the ram 68 has been extended to bring the roller to the lower end of the cam track so that the struts support the extension 60 in its horizontal, linking position. When the ram is contracted the rollers 74 ride along the cam track 76 to its upper end as the extension 60 is allowed to swing down under its own weight to a substantially vertical position.

The fixed track extension 60a and its displacement mechanism are identical and in mirror image to the platform extension 60; the parts are indicated by the same reference numbers but with the suffix "a". In FIG. 1 the fixed track extension is of course shown in its substantially vertical collapsed condition and the manner of its adjustment will be clear from the preceding description of the tipping structure extension. Thus, with the extension 60 swung down as described above, the counterpart extension 60a on the fixed track can be raised to the linking position, forming a projecting end of the fixed track to the shorter length rotary tipping structure for the rail car R'.

I claim:

1. A rotary dumper for dumping the contents of a rail car, the rotary dumper comprising: a tipping structure having a platform for the rail car and coaxial ring members at or adjacent the ends of the structure, clamping means mounted on said structure for clamping the rail car on said platform, rotary mountings supporting said ring members for rotation of the tipping structure about the common axis of the ring members from an upright position to dump the contents of the rail car clamped on the platform, and flexible connection means which provide a connection between the rail car platform and the ring members that limits the transmission to the ring members of bending moments produced by loads on the rail platform when the tipping structure is in the upright position.

2. A dumper according to claim 1 wherein the flexible connections comprise pin joints having rotary axis transverse to said common rotary axis and at least approximately parallel to the rail car platform.

3. A dumper according to claim 1 wherein the tipping structure comprises at least one main load-carrying member extending uninterruptedly between the end ring members and secured thereto by said flexible connection means.

4. A dumper according to claim 3 wherein said at least one load-carrying member is below the level of a rail track on the rail car platform.

5. A dumper according to claim 1 wherein the tipping structure includes at least one side beam located for disposition adjacent a side of a rail car on the platform.

6. A dumper according to claim 5 wherein said at least one side beam carries the rail car clamping means.

7. A dumper according to claim 4 wherein the tipping structure includes at least one side beam located for disposition adjacent a side of a rail car on the platform and said at least one side beam forms a rigid structure with said one load carrying member.

8. A dumper according to claim 7 wherein a terminal side beam member is provided at least at one end of the rail car platform and flexible connection means connect said terminal side beam member to the adjacent end ring member and said rigid structure.

9. A dumper according to claim 1 further comprising means for varying the length of the rail car platform.

10. A rail car dumper installation having a tipping structure comprising a rail car platform, a first section of rail track mounted on said platform, the tipping structure having means for clamping the rail car on said first section of track on the platform while the structure is rotated from an upright position to dump the contents of the rail car, a fixed second section of rail track located at end of the platform for alignment with said first section with the tipping structure in its upright position, said first and second sections of track having a spacing between them, a linking section of track spanning said spacing, said linking section forming an extension of a selected one of said first and second sections and being secured to the selected section, for forming an extension thereof to the other of said sections, whereby the operative length of the rotary rail car platform is varied.

11. An installation according to claim 10 having a fixed structure adjacent said one end of the platform and said linking section of track is provided alternatively by a length of track carried by the rotary structure or by a length of track supported independently of the rotary structure from said fixed structure, said lengths of track being locatable alternatively in an operative position linking said first and second track sections.

12. An installation according to claim 11 wherein pivot mounting means are provided for said alternative lengths of track whereon said track lengths pivot below the rail car platform when in their inoperative position.

* * * * *